(12) United States Patent
Araujo et al.

(10) Patent No.: US 10,749,892 B2
(45) Date of Patent: Aug. 18, 2020

(54) AUTOMATIC DETECTION OF POINTS OF COMPROMISE

(71) Applicant: Feedzai—Consultadoria e Inovação Tecnólogica, S.A., Coimbra (PT)

(72) Inventors: Miguel Ramos de Araujo, Oporto (PT); Miguel Sousa Borges de Almeida, Lisbon (PT); Pedro Gustavo Santos Rodrigues Bizarro, Lisbon (PT)

(73) Assignee: Feedzai—Consultadoria e Inovação Tecnólogica, S.A., Coimbra (PT)

( * ) Notice: Subject to any disclaimer, the term of this patent is extended or adjusted under 35 U.S.C. 154(b) by 0 days.

(21) Appl. No.: 16/355,562

(22) Filed: Mar. 15, 2019

(65) Prior Publication Data

US 2019/0215334 A1  Jul. 11, 2019

Related U.S. Application Data

(63) Continuation of application No. 15/386,989, filed on Dec. 21, 2016, now Pat. No. 10,284,590.
(Continued)

(51) Int. Cl.
| | |
|---|---|
| *H04L 29/06* | (2006.01) |
| *G06F 21/57* | (2013.01) |
| *G06Q 20/40* | (2012.01) |

(52) U.S. Cl.
CPC ........ *H04L 63/1433* (2013.01); *G06F 21/577* (2013.01); *G06Q 20/4016* (2013.01); *G06F 2221/2111* (2013.01)

(58) Field of Classification Search
CPC ................. H04L 63/1433; G06F 2221/2111
See application file for complete search history.

(56) References Cited

U.S. PATENT DOCUMENTS

| | | |
|---|---|---|
| 8,612,340 B1 | 12/2013 | Yan |
| 2005/0055373 A1 | 3/2005 | Forman |

(Continued)

OTHER PUBLICATIONS

Paciorek et aL "Parallelizing Gaussian Process Calculations In R." In: arXiv preprint arXiv:1305.4886. May 21, 2013 (May 21, 2013) Retrieved from <https://arxiv.org/pdf/1305.4886.pdf> entire document.

(Continued)

*Primary Examiner* — Dao Q Ho
(74) *Attorney, Agent, or Firm* — Van Pelt, Yi & James LLP

(57) ABSTRACT

Techniques described herein include determining, for each account of several accounts, an element blame score (EBS) for each potential point of compromise (POC) of a plurality of POCs. Determining the EBS includes: representing the determinations as a computer computational matrix operation, dividing a matrix of the operation into blocks, and distributing the blocks among nodes for distributed computation. The method further includes determining an overall compromise blame score (OCBS) for each potential POC based on the determined EBS and determining whether the OCBSs have converged. If the OCBSs have converged, select at least one of the potential POCs as a likely POC based at least on the corresponding OCBS of the selected likely POC. If the determined OCBSs have not converged, updating the OCBS for each potential POC and the EBSs for each potential POC.

21 Claims, 7 Drawing Sheets

| LOCATION | L1 | L2 | L3 |
|---|---|---|---|
| PROBABILITY | 6% | 20% | 35% |

704.3

| | L1 | L2 | L3 |
|---|---|---|---|
| C1 | 0% | 0% | -- |
| C2 | 0% | 0% | 0% |
| C3 | 10% | 33% | 57% |
| C4 | -- | 36% | 64% |

702.3

Related U.S. Application Data

(60) Provisional application No. 62/293,535, filed on Feb. 10, 2016.

(56) References Cited

U.S. PATENT DOCUMENTS

| | | | |
|---|---|---|---|
| 2007/0061259 A1 | 3/2007 | Zoldi | |
| 2010/0169192 A1* | 7/2010 | Zoldi | G06Q 40/00 705/30 |
| 2011/0307382 A1 | 12/2011 | Siegel | |
| 2016/0217470 A1* | 7/2016 | Gerard | G06Q 20/4016 |

OTHER PUBLICATIONS

V V Gergel: "Introduction to Parallel Programming—Parallel Methods for Matrix Multiplication", May 12, 2007. Retrieved from the Internet: URL: https://web.archive.org/web/20150412121243if_/http://www.hpcc.unn.ru:80/mskurs/ENG/PPT/pp08.pdf [retrieved on Jul. 18, 2019].

* cited by examiner

|    | L1  | L2  | L3  |
|----|-----|-----|-----|
| C1 | 0%  | 0%  | --  |
| C2 | 0%  | 0%  | 0%  |
| C3 | 33% | 33% | 33% |
| C4 | --  | 50% | 50% |

703.1:

|    | L1  | L2  | L3  |
|----|-----|-----|-----|
| C3 | 33% | 33% | 33% |
| C4 | --  | 50% | 50% |

| LOCATION    | L1  | L2  | L3  |
|-------------|-----|-----|-----|
| PROBABILITY | 11% | 21% | 28% |

702.2:

|    | L1  | L2  | L3  |
|----|-----|-----|-----|
| C1 | 0%  | 0%  | --  |
| C2 | 0%  | 0%  | 0%  |
| C3 | 18% | 35% | 47% |
| C4 | --  | 43% | 57% |

FIG. 7C

| LOCATION | L1 | L2 | L3 |
|---|---|---|---|
| PROBABILITY | 6% | 20% | 35% |

704.3

| | L1 | L2 | L3 |
|---|---|---|---|
| C1 | 0% | 0% | -- |
| C2 | 0% | 0% | 0% |
| C3 | 10% | 33% | 57% |
| C4 | -- | 36% | 64% |

| LOCATION | L1 | L2 | L3 |
|---|---|---|---|
| PROBABILITY | 3% | 17% | 40% |

704.4

| | L1 | L2 | L3 |
|---|---|---|---|
| C1 | 0% | 0% | -- |
| C2 | 0% | 0% | 0% |
| C3 | 5% | 28% | 67% |
| C4 | -- | 30% | 70% |

| LOCATION | L1 | L2 | L3 |
|---|---|---|---|
| PROBABILITY | 2% | 15% | 46% |

704.5

⋮

| ACCOUNT | LOC 1 | LOC 2 | LOC 3 |
|---|---|---|---|
| C1 | 0% | 0% | -- |
| C2 | 0% | 0% | 0% |
| C3 | 0% | 0% | 100% |
| C4 | -- | 0% | 100% |

702.5

| LOCATION | L1 | L2 | L3 |
|---|---|---|---|
| PROBABILITY | 0% | 0% | 66% |

704.6

US 10,749,892 B2

AUTOMATIC DETECTION OF POINTS OF COMPROMISE

CROSS REFERENCE TO OTHER APPLICATIONS

This application is a continuation of U.S. patent application Ser. No. 15/386,989, entitled AUTOMATIC DETECTION OF POINTS OF COMPROMISE filed Dec. 21, 2016, which claims priority to U.S. Provisional Patent Application No. 62/293,535, entitled AUTOMATIC DETECTION OF POINTS OF COMPROMISE filed Feb. 10, 2016, both of which are incorporated herein by reference for all purposes.

BACKGROUND OF THE INVENTION

Electronic security measures are computer-implemented techniques to protect possessions and information. Electronic security measures are aimed at preventing security breaches including the misappropriation of information and the subsequent use of misappropriated information. An example of a point of compromise is a transaction location (e.g., ATM or POS terminal) that has been compromised and accounts (e.g., payment instruments) that have utilized the point of compromise may have had their account information misappropriated at the point of compromise. A computer attempts to detect a security breach by analyzing related transactions/data. However, it is often difficult to efficiently, quickly, and accurately detect a security breach with traditional computer systems given the computing power required to analyze vast amounts of transaction data quickly. The longer it takes to detect a point of compromise, the more likely stolen information will be used. Thus, there is a need for an electronic security measure that efficiently, quickly, and accurately detects sources of security breaches to, among other things, prevent use of stolen information.

BRIEF DESCRIPTION OF THE DRAWINGS

Various embodiments of the invention are disclosed in the following detailed description and the accompanying drawings.

FIG. 7A is a conceptual diagram of an initial state of a computer computational matrix for identifying one or more likely POCs.

FIG. 7B is a conceptual diagram of a state of a computer computational matrix for identifying one or more likely POCs after a first iteration.

FIG. 7C is a conceptual diagram of a state of a computer computational matrix for identifying one or more likely POCs after a second iteration.

FIG. 7D is a conceptual diagram of a state of a computer computational matrix for identifying one or more likely POCs after a third iteration.

FIG. 7E is a conceptual diagram of a computer computational matrix for identifying one or more likely POCs including converging overall compromise blame scores.

DETAILED DESCRIPTION

Figure 1:
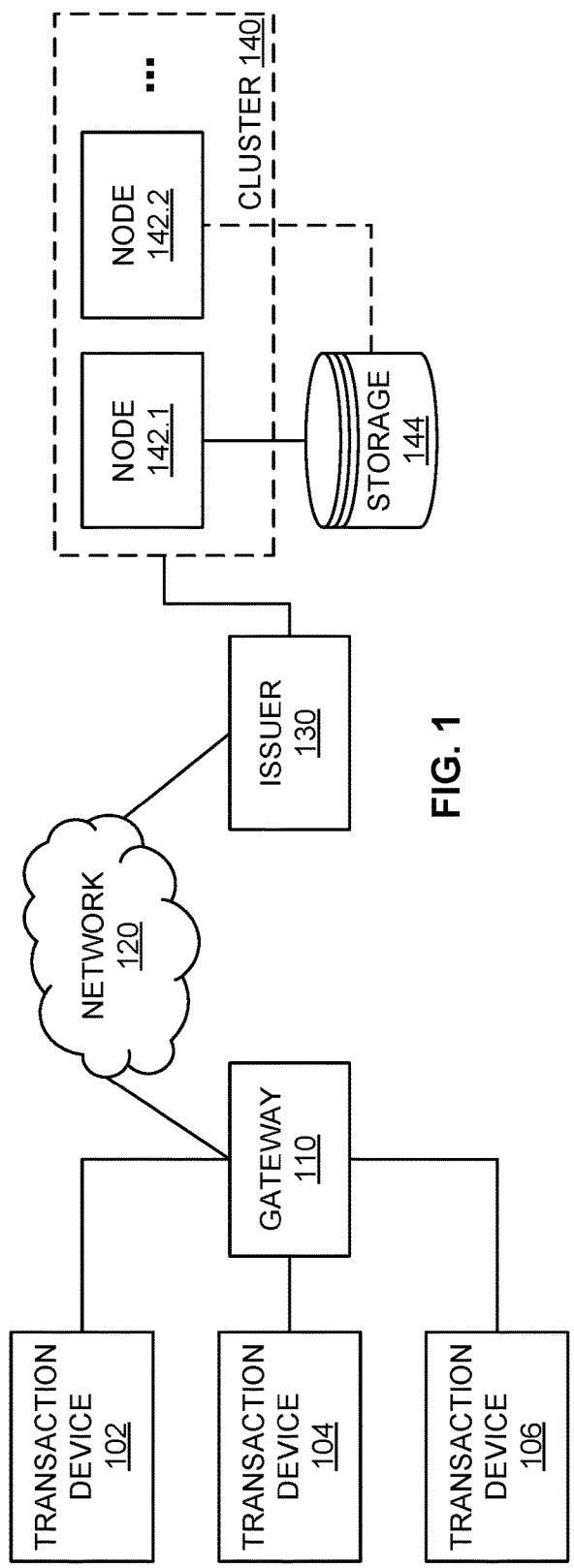
FIG. 1 is a block diagram illustrating an embodiment of a system for identifying one or more points of compromise ("POCs").

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Techniques of the present disclosure detect a security breach and provide parallelization of transaction data processing to efficiently, quickly, and accurately detect the security breach. One type of security breach is compromise of data in which the data is obtained during a fraudulent transaction. The security breach may have originated at a point of compromise. A point of compromise ("POC") is a source location of fraudulent data compromises. A single POC may lead to a group of victims of fraud (e.g., compromised accounts) that all provided account information at the same POC. A location becomes a POC when information provided at the location is misappropriated (e.g., intercepted, stolen, copied, and illegally transmitted over a network). The location can be a virtual location such as an Internet location or a physical location such as a store terminal. For example, the location has an associated transaction device, and the location is breached when an unauthorized device is used to read a victim's card (e.g., by credit card skimmer or by a malicious employee when the credit card leaves the victim's sight). While a location is compromised, any account information that was provided at the POC is vulnerable for misappropriation. Thus, early and accurate detection of a POC prevents and/or reduces the impact of security breaches. Timely discovery of the POC prevents fraudulent use of other accounts that may have been compromised at the same location in a related time frame. Identifying a POC and related information enables a transaction device at the POC to be disabled or repaired before further accounts are compromised, and enables accounts used at the POC during the related time frame (e.g., possibly compromised accounts) to be disabled (e.g., re-issue new credit card to account holder). By using the data representation and division and distributed processing techniques described herein, likely POCs may be identified efficiently and quickly.

Given a set of transactions, techniques of the present disclosure detect the location at which the corresponding account has been compromised. Various types of compromises are detectable, including database breaches and skimming devices in ATMs and compromised POS terminals. In some embodiments, for each account of a plurality of accounts, an element blame score is calculated for each potential POC of a plurality of potential POCs. The calculation of the element blame score includes representing the calculations as at least a computer computational matrix operation, dividing a matrix of the computer computational matrix operation into computational blocks, and distributing the blocks among a plurality of computational computer nodes for distributed computer computation. Based on the determined element blame scores, an overall compromise blame score is calculated for each potential POC. It is determined whether the determined overall compromise blame scores have converged. If the determined overall compromise blame scores have converged, at least one of the potential POCs is selected as a likely POC based on the corresponding overall compromise blame score of the selected likely POC. If the determined overall compromise blame scores have not converged, the element blame scores are updated for each potential POC of the plurality of potential POCs for each account of the plurality of accounts.

In some embodiments, the determination of a POC is implemented by a scalable distributed processing executable by nodes of a cluster. Quick processing speed is achieved by dividing and distributing calculations across multiple systems. For example, because an enormous amount of credit card transaction data needs to be processed to identify patterns that identify likely POCs, the processing, selection, division, and distribution techniques described herein have been engineered to achieve accurate results efficiently and accurately.

FIG. 1 is a block diagram illustrating an embodiment of a system for identifying one or more POCs. FIG. 1 shows components of an environment in which one or more nodes in a cluster 140 identify a POC. The environment includes one or more transaction devices 102, 104, 106, gateway 110, network 120, issuer 130, and a cluster 140 made up of one or more nodes 142.1, 142.2.

Transaction devices 102-106 each receive account information and transmit transaction data via gateway 110 to verify the account information. In some embodiments, transaction devices facilitate a transaction. A transaction includes exchange of information. For example, processing a transaction involving a purchase includes receiving account (e.g., credit card account) information and transaction details (e.g., purchase amount) at a transaction location and determining whether to approve the transaction. An approved transaction may mean that payment by the account is accepted in exchange for goods or services. A denied transaction may mean that payment by the account is denied.

In some embodiments, the account information includes payment information such as a credit card account number, a debit account number, a bank account wire number, and the like. In some embodiments, the transaction data is generated by the transaction device by processing/filtering the account information. For example, an account number can be encrypted/hashed to protect the account number. A transaction device may be implemented by a terminal, a point of sale (POS) device, or any other device that accepts account information. For example, a terminal includes a credit card terminal that processes payment based on a received credit card account number. The transaction device may receive and parse account information using a variety of electronic techniques such as a chip reader, a magnetic stripe reader, bar code scanner, etc. In some embodiments, a transaction device is associated with a location and may be identified by its associated location. For example, a brick and mortar retailer (BM) having three checkout terminals (1-3) each equipped with one of the transaction devices 102-106 may be identified by transaction devices BM1, BM2, and BM3. As another example, a transaction device is a website processing payment for goods and services purchased over the Internet.

A transaction location is typically associated with a transaction device. Examples of transaction devices include an ATM, POS terminal, computer, and the like. A transaction location is a location where account information can be received to initiate a transaction. A transaction location may be a physical location, a location of a terminal, a Web location, and the like. Examples of transaction locations include one or more checkout terminals, one or more stores, a group of stores, or system-wide (e.g., entire E-commerce merchant), and the like.

A transaction device may be subject to security vulnerabilities. One type of security breach involves making the transaction device a POC by diverting or copying received account information by an unauthorized party. For example, an unauthorized party installs a credit card skimmer on the transaction device to store account information provided to the transaction device.

Gateway 110 receives transaction data from one or more transaction devices 102-106, routes the transaction data to network 120, and returns an approval or decline notice based on the approval process of network 120. Gateway 110 may include a payment acquirer or Internet Service Provider. For example, the payment acquirer may be software hosted on a third-party server that handles transmissions between a merchant (represented by transaction devices 102-106) and an issuer 130. In some embodiments, a gateway is associated with an acquiring bank (also referred to as a merchant bank). The acquiring bank is registered with a network 120, wherein the network represents a card association (e.g., Visa®, MasterCard®, American Express®, etc.). The acquiring bank contracts with merchants to create and maintain accounts allowing the merchant to accept accounts such as credit and debit cards. In some embodiments, gateway 110 processes and encrypts the transaction data before routing the transaction data. In some embodiments, gateway 110 groups one or more transactions together and sends the batch of transactions to issuer 130 via network 120.

Network 120 is a platform for transmitting data between devices to support payment processing and electronic payments. In some embodiments, network 120 is associated with a credit card association (e.g., Visa®, Mastercard®, American Express®, etc.) and supports communications between association members such as an acquiring bank (e.g., gateway 110) and an issuing bank (e.g., issuer 130). In some embodiments, network 120 implements a clearing house to provide clearing and settlement services. Network 120 determines an appropriate destination to route the transaction data. For example, several issuer banks may be members of the network. The network determines the issuer corresponding to the transaction data and routes the transaction to the appropriate issuer. For simplicity, only one issuer 130 is shown in FIG. 1. In some instances, network 120 chooses from among several issuers to which transaction data is sent. In some embodiments, network 120 filters the received transaction data. For example, network 120 may be aware of fraudulent accounts and determine whether the received transaction data includes a fraudulent account. Network 120 may include one or more network connected servers for processing, routing, and/or facilitating transactions.

Issuer 130 receives transaction data from network 120 and determines whether to approve or deny a transaction (e.g., a provided account/payment). For example, issuer 130 includes one or more servers/systems of an issuing bank. In some embodiments, the issuer is associated with an acquiring bank via network 120. In some embodiments, determining whether to approve or deny an account/payment method includes determining whether the transaction is fraudulent. For example, a transaction is considered fraudulent if the payment method (e.g., account) used in the transaction is involved in a security breach (e.g., whether the payment method has interacted with a point of compromise). In some embodiments, issuer 130 calls one or more nodes of cluster 140 in real-time to determine whether there is a security breach. For example, issuer 130 queries one or more nodes of cluster 140 with one or more transactions and seeks feedback from one or more nodes of cluster 140 about whether to proceed with the transaction. For example, if the transaction involves a possible security breach, the transaction is denied. Identifying whether a payment method is involved in a security breach is further described herein. In some embodiments, issuer 130 provides one or more nodes of cluster 140 with a list of (past) transactions seeking identification from one or more nodes of cluster 140 about likely POCs and/or compromised accounts based on the transactions.

In some embodiments, nodes of cluster 140 are controlled and managed by issuer 130. For example, devices/systems of the issuer retain transaction information and perform analysis to identify likely POCs. In some embodiments, nodes of cluster 140 are controlled and managed by a third party. For example, issuer 130 has contracted with the third party to perform analysis using data provided the issuer (e.g., transaction information) to identify for the issuer likely POCs.

Figure 3:
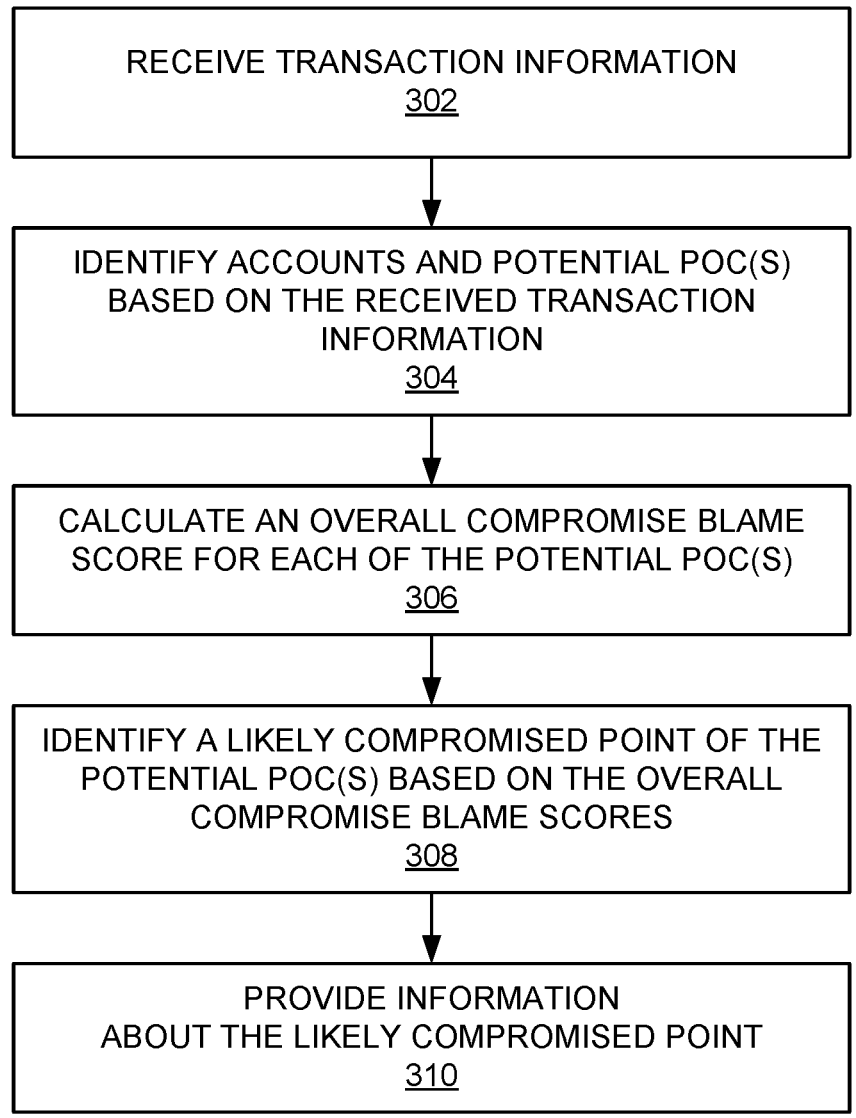
FIG. 3 is a flow chart illustrating an embodiment of a process for identifying one or more likely POCs.
Figure 4:
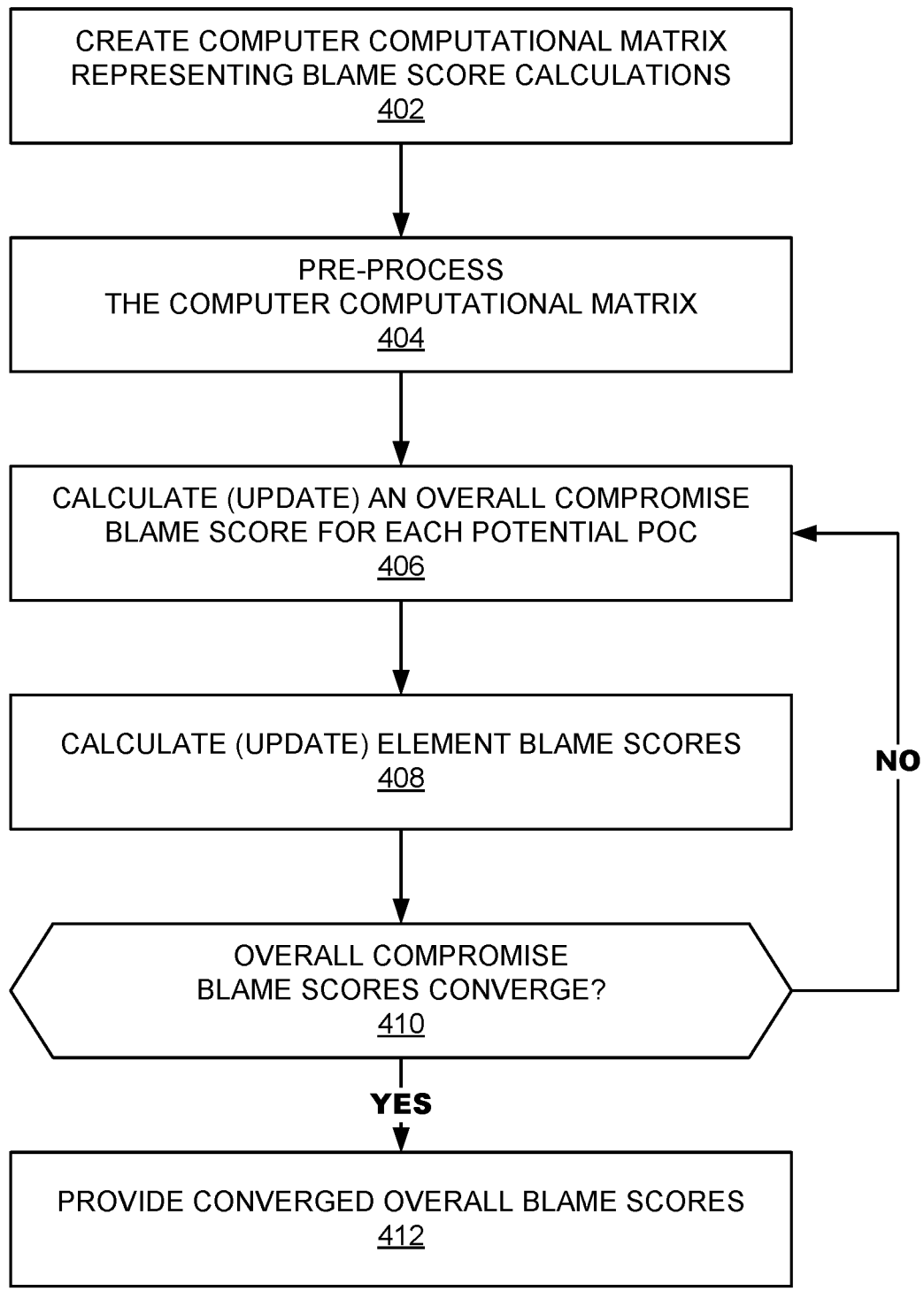
FIG. 4 is a flow chart illustrating an embodiment of a process for calculating one or more blame scores.
Figure 5:
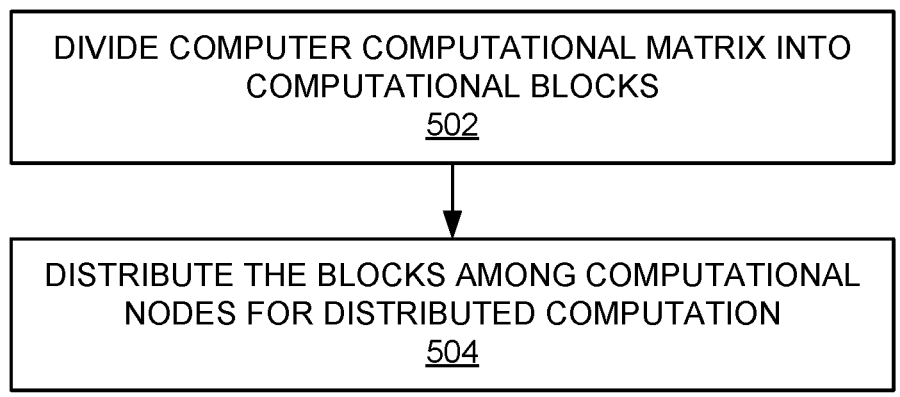
FIG. 5 is a flow chart illustrating an embodiment of a process for identifying one or more POCs including distributing calculation of one or more blame scores.

One or more nodes of cluster 140 perform the processes described herein, e.g., the processes shown in FIGS. 3-5. The processes can be performed in parallel or distributed among the one or more nodes as further described herein, e.g., with respect to FIG. 5. In some embodiments, one or more nodes of cluster 140 receive a list of transactions from issuer 130, analyze the transactions, and provide output. The process shown in FIG. 3 is an example of how transactions are analyzed by the node(s).

In some embodiments, one or more nodes of cluster 140 receive transaction information, identify potential POCs therefrom, and determine which of the potential POCs are likely POCs based on the identified potential POCs. A potential POC represents a feature that a subset of transactions may have in common. Example features include a specific POS terminal ID, a store ID, a merchant name (e.g., all stores in a corporation), time, and the like. A potential POC has interacted with a compromised account and thus could ultimately be identified as a POC. From among the potential POCs, one or more likely POCs are identified. A likely POC is a potential POC that meets a criteria (further described herein), and represents a transaction location that has likely been compromised. For example, a potential POC that is not a source of compromise despite having interacted with a compromised account is not identified as a likely POC. In some embodiments, output of the likely POCs includes associated information such as location, date/time when the point is compromised, and accounts that interacted with the likely POC during the date/time. In some embodiments, the associated information is used to identify other accounts that may have been compromised based on accounts that interacted with the likely POC during a time period during which the location was likely compromised.

In some embodiments, likely POCs are identified from past transactions. Based on information that a transaction location is a likely POC, a transaction at a transaction location may be denied or marked during the payment verification process. For example, if a transaction involves a previously-identified likely POC, the transaction is denied or marked. Accounts involved in a marked transaction are likely compromised. In response to the likely compromise, a new account may be issued to the account holder or a new card or payment instrument may be issued for the same account.

In some embodiments, one or more nodes 142.1, 142.2 in cluster 140 are controlled by issuer 130. For example, the one or more nodes may be provided within the computing environment of issuer 130. In some embodiments, the one or more nodes are controlled by a third party (not issuer 130), and the issuer contracts with the third party for performance of POC analysis.

For example, POC analysis is performed as follows. In an embodiment in which the node(s) are controlled by the issuer, the issuer controls the node(s) according to processes described herein, e.g., the process shown in FIG. 3 to determine likely POCs. In an embodiment in which the node(s) are controlled by a third party, the issuer provides transaction data to node(s), and the node(s) identify likely POCs, where the nodes operate according to the processes described herein, e.g., the process shown in FIG. 3 to determine likely POCs. The node(s) return results of POC analysis such as likely POCs to the issuer.

Results of POC analysis are useful for, among other things, determining whether to allow or deny a transaction. For example, any account that has previously interacted with the likely POC during a breach time window has likely been compromised. A transaction attempted to be performed by an account identified as likely compromised is denied. As another example, transaction authorization is handled as follows. Previously identified likely POCs are stored in storage 144. When performing transaction authorization based on received transaction information, issuer 130 accesses storage 144 to determine whether the received transaction information is associated with a transaction device/location previously identified as a likely POC, the likely POC having been stored in storage 144. For example, if the transaction information matches a likely POC, the issuer denies the transaction, or marks the transaction (e.g., send a serviceperson to check for a card skimmer on the transaction device, issue a new credit card for a compromised account involved in the transaction, etc.).

Storage 144 stores information about transactions. In some embodiments, storage 144 stores a list of transactions and/or a list of stolen/fraudulent accounts. In some embodiments, storage 144 stores a list of accounts. The transaction information can be provided as a single transaction or a list of transactions. Examples of transaction information are discussed with respect to 302 of FIG. 3.

A payment verification process may take place within the environment shown in FIG. 1. In operation, a transaction device (102, 104, and/or 106) receives transaction information such as account, time, amount, etc. as further described herein. In some embodiments, the transaction device processes the transaction information (e.g., packages the data). The transaction device sends the transaction data to gateway 110. Gateway 110 routes the received transaction data to network 120. Network 120 determines an issuer based on the transaction data, and sends the transaction data to the issuer. Issuer 130 determines whether to approve or deny the transaction based on the transaction data and a security process performed by one or more nodes 142.1, 142.2. The security process performed by the one or more nodes includes analyzing the received transaction data to identify likely POCs. The process shown in FIG. 3 is an example of a security process performed by the one or more nodes. In some embodiments, likely POCs are stored such that future transactions are handled based on previously-identified likely POCs.

In some embodiments, likely POCs are used by the one or more nodes to determine whether to authorize a transaction. In some embodiments, the likely POCs are provided to issuer 130 for the issuer to determine how to handle the transaction. The transaction may be handled as follows. If the transaction involves a likely POC, the transaction is denied or marked. The likely POC may be disabled or repaired. For example, a serviceperson is sent to check for a card skimmer on the transaction device. Accounts that have interacted with the likely POC may be identified as compromised. Account holders of compromised accounts may be notified, provided with a new credit card, etc. If the transaction does not involve a likely POC, the transaction is approved.

Network 120 and gateway 110 relay the approval or decline notice back to the transaction device. If the transaction is approved, payment has been accepted and the transaction is successful. If the transaction is declined, payment has not been accepted and the transaction is declined.

Figure 2:
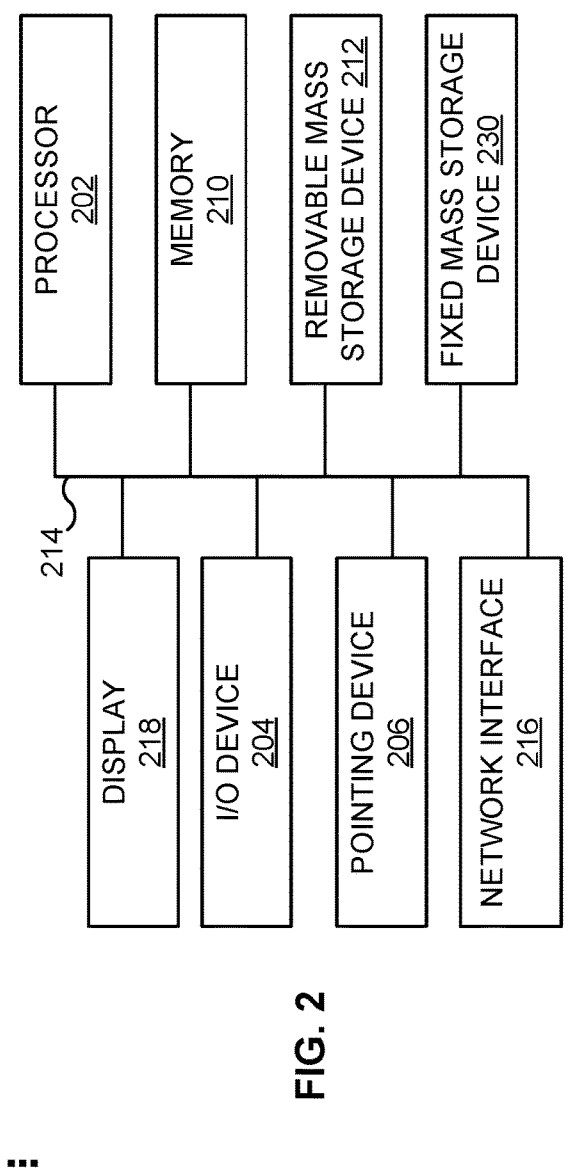
FIG. 2 is a functional diagram illustrating a programmed computer system for identifying one or more POCs in accordance with some embodiments.

FIG. 2 is a functional diagram illustrating a programmed computer system for identifying one or more POCs in accordance with some embodiments. The programmed computer system is an example of a node (142.1 or 142.2) shown in FIG. 1. As will be apparent, other computer system architectures and configurations can be used to perform the techniques described herein. Returning to FIG. 2, the computer system, which includes various subsystems as described below, includes at least one microprocessor subsystem (also referred to as a processor or a central processing unit (CPU) 202). For example, processor 202 can be implemented by a single-chip processor or by multiple processors. In some embodiments, processor 202 is a general purpose digital processor that controls the operation of the computer system. In some embodiments, processor 202 also includes one or more coprocessors or special purpose processors (e.g., a graphics processor, a network processor, etc.). Using instructions retrieved from memory 210, processor 202 controls the reception and manipulation of input data received on an input device (e.g., pointing device 206, I/O device interface 204), and the output and display of data on output devices (e.g., display 218). In some embodiments, processor 202 is used to perform the processes described herein with respect to FIGS. 3-5.

Processor 202 is coupled bi-directionally with memory 210, which can include, for example, one or more random access memories (RAM) and/or one or more read-only memories (ROM). As is well known in the art, memory 210 can be used as a general storage area, a temporary (e.g., scratch pad) memory, and/or a cache memory. Memory 210 can also be used to store input data and processed data, as well as to store programming instructions and data, in the form of data objects and text objects, in addition to other data and instructions for processes operating on processor 202. Also as is well known in the art, memory 210 typically includes basic operating instructions, program code, data, and objects used by the processor 202 to perform its functions (e.g., programmed instructions). For example, memory 210 can include any suitable computer readable storage media described below, depending on whether, for example, data access needs to be bi-directional or uni-directional. For example, processor 202 can also directly and very rapidly retrieve and store frequently needed data in a cache memory included in memory 210.

A removable mass storage device 212 provides additional data storage capacity for the computer system, and is optionally coupled either bi-directionally (read/write) or uni-directionally (read only) to processor 202. A fixed mass storage 230 can also, for example, provide additional data storage capacity. For example, storage devices 212 and/or 230 can include computer readable media such as magnetic tape, flash memory, PC-CARDS, portable mass storage devices such as hard drives (e.g., magnetic, optical, or solid state drives), holographic storage devices, and other storage devices. Mass storages 212 and/or 230 generally store additional programming instructions, data, and the like that typically are not in active use by the processor 202. It will be appreciated that the information retained within mass storages 212 and 230 can be incorporated, if needed, in standard fashion as part of memory 210 (e.g., RAM) as virtual memory.

In addition to providing processor 202 access to storage subsystems, bus 214 can be used to provide access to other subsystems and devices as well. As shown, these can include a display 218, a network interface 216, an input/output (I/O) device interface 204, a pointing device 206, as well as other subsystems and devices. For example, pointing device 206 can include or operate in conjunction with a camera, a scanner, etc.; I/O device interface 204 can include a device interface for interacting with a touchscreen (e.g., a capacitive touch sensitive screen that supports gesture interpretation), a microphone, a sound card, a speaker, a keyboard, a pointing device (e.g., a mouse, a stylus, a human finger), a Global Positioning System (GPS) receiver, an accelerometer, and/or any other appropriate device interface for interacting with the system. Multiple I/O device interfaces can be used in conjunction with the computer system. The I/O device interface can include general and customized interfaces that allow the processor 202 to send and, more typically, receive data from other devices such as keyboards, pointing devices, microphones, touchscreens, transducer card readers, tape readers, voice or handwriting recognizers, biometrics readers, cameras, portable mass storage devices, and other computers.

The network interface 216 allows processor 202 to be coupled to another computer, computer network, or telecommunications network using a network connection as shown. For example, through the network interface 216, the processor 202 can receive information (e.g., data objects or program instructions) from another network, or output information to another network in the course of performing a process/process steps. Information, often represented as a sequence of instructions to be executed on a processor, can be received from and outputted to another network. An interface card or similar device and appropriate software implemented by (e.g., executed/performed on) processor 202 can be used to connect the computer system to an external network and transfer data according to standard protocols. For example, various process embodiments disclosed herein can be executed on processor 202, or can be performed across a network such as the Internet, intranet networks, or local area networks, in conjunction with a remote processor that shares a portion of the processing. Additional mass storage devices (not shown) can also be connected to processor 202 through network interface 216.

In addition, various embodiments disclosed herein further relate to computer storage products with a computer readable medium that includes program code for performing various computer-implemented operations. The computer readable medium includes any data storage device that can store data which can thereafter be read by a computer system. Examples of computer readable media include, but are not limited to: magnetic media such as disks and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code as produced, for example, by a compiler, or files containing higher level code (e.g., script) that can be executed using an interpreter.

The computer system shown in FIG. 2 is but an example of a computer system suitable for use with the various embodiments disclosed herein. Other computer systems suitable for such use can include additional or fewer subsystems. In some computer systems, subsystems can share components (e.g., for touchscreen-based devices such as smart phones, tablets, etc., I/O device interface 204 and display 218 share the touch sensitive screen component, which both detects user inputs and displays outputs to the user). In addition, bus 214 is illustrative of any interconnection scheme serving to link the subsystems. Other computer architectures having different configurations of subsystems can also be utilized.

The techniques described herein can be implemented by a processor such as processor 202 shown in FIG. 2. The processor can be implemented as software components, as hardware components such as programmable logic devices (e.g., microprocessors, field-programmable gate arrays (FPGAs), digital signal processors (DSPs), etc.), Application Specific Integrated Circuits (ASICs) designed to perform certain functions, or a combination thereof. In this example, the ADC is implemented as a network device that manages network traffic and allows clients to request Web resources within an application delivery network.

FIG. 3 is a flow chart illustrating an embodiment of a process for identifying one or more likely POCs. The process of FIG. 3 may be at least in part implemented on one or more components of nodes in cluster 140 shown in FIG. 1. In some embodiments, the process shown in FIG. 3 is performed by a processor, e.g., a processor implemented by a single-chip or by multiple processors such as processor 202 shown in FIG. 2.

At 302, transaction information is received. Based on the transaction information, potential POCs are identified. Transaction information (also referred to as "transaction parameter values") includes attributes of one or more transactions (e.g., time, merchant name, location, etc.) made at a transaction location involving an account. In some embodiments, a transaction location is a location where account information can be received to initiate a transaction. A transaction location may be a physical location, a location of a terminal, a Web location, and the like. Examples of transaction locations include one or more checkout terminals, one or more stores, a group of stores, or system-wide (e.g., entire E-commerce merchant), and the like. For example, transaction information is collected and provided by an issuer such as issuer 130 shown in FIG. 1 to nodes 142.1, 142.2.

The transaction information can be provided as a single transaction or a list of transactions. For example, a list of transactions includes, for each transaction, one or more associated fields storing characteristics of the transaction. By way of non-limiting example, fields include details about the account and payment involved in the transaction, devices/entities involved in the transaction, when the transaction is made, and where the transaction is made. Details about the account/payment involved in the transaction include expiration date of the account, account details (e.g., credit card account number/CVV code hashed to protect an identity of a cardholder), type of currency used, amount of payment, category of purchase (e.g., grocery store, gas, entertainment, etc.), how the payment was accepted (e.g., by swipe or chip), whether the payment is a periodic charge (e.g., subscription), whether the payment is a pre-authorization, and the like. Identification of devices/entities involved in the transaction includes merchant identification such as name, code, address, city, country, and/or zipcode, whether the transaction is made online or at a brick and mortar store, gateway identifier from which the transaction is received (e.g., identifying a gateway such as gateway 110 shown in FIG. 1), and the like. Information about when the transaction is made includes a time, a date, and the like. Information about where the transaction is made includes a geographical location (e.g., a city and state name, a region, GPS coordinates, etc.), a specific terminal where the transaction is made, and the like.

In some embodiments, the transaction information corresponds to transactions occurring within a specified window of time. For example, as time progresses, more transaction information is generated and provided in batches. A first batch includes transaction information collected during a first window of time, a second batch includes transaction information collected during a second window of time where the second window of time is subsequent to the first window of time, etc. In various embodiments, the windows of time are sequential, non-overlapping windows of the same length, windows of various dynamically determined lengths, etc. In some embodiments, the time window is defined based on a compromised account. For example, transaction information is set for a period of time defined with respect to a transaction involving the compromised account such as beginning with the time when the account is detected to be compromised (e.g., first involved in a fraudulent transaction). In some embodiments, transaction information is received upon request by one or more nodes (nodes 142.1, 142.2 shown in FIG. 1) or at the initiative of the issuer. In some embodiments, transaction information is received as part of operation of an issuer such as a payment verification process. In some embodiments, transaction information is received in response to completion of a transaction, e.g., after a transaction has been approved or denied by the issuer. In some embodiments, transaction information is periodically received such as after a number of transactions have been completed or every few hours or days.

To improve the efficiency of identifying a likely POC, the transaction information is filtered to identify relevant information. For example, a location that has not interacted with a compromised account is not likely the source of compromise. Thus, by filtering out transactions associated with locations that a compromised account has not interacted with, the filtered transaction information includes only transaction information for locations that have interacted with the compromised account. As another example, if an earliest time of compromise is known (e.g., account was compromised sometime after January 2016), transactions taking place before the earliest time of compromise can be filtered out.

At 304, accounts and potential POCs are identified based on the received transaction information.

Accounts are identified by parsing account information from the received transaction information. For example, an account is identified by account details such as a credit card account number, which may be received in combination with other information such as a CVV code and/or expiration date of the account. An account can be identified without decrypting encrypted account information. For example, a hashed credit card account number is sufficient to identify an account. In some embodiments, a predetermined list of accounts is received with the transaction information at 302.

A compromised account is an account that is no longer secure and whose information can be misused by an unauthorized user. An account becomes compromised when account information is misappropriated (e.g., intercepted, stolen, copied, illegally transmitted information over a network, possessed by an unauthorized user, etc.) or misused (e.g., used by an unauthorized user). In some embodiments, an account is reported as compromised by a customer, a bank, or other entity in the system shown in FIG. 1 (e.g., by a merchant operating transaction devices 102-106, gateway 110, network 120, or issuer 130). In some embodiments, account identification includes identification of accounts that are known to have been compromised, as further described herein, e.g., with respect to FIG. 3.

Potential POCs include locations that have interacted with compromised accounts. In some embodiments, locations that have interacted with compromised accounts are identified as potential POCs because they have a likelihood of being a POC. For example, the previous locations where a known to be compromised account has conducted transactions are potential locations where there was an opportunity to intercept account information of the account. The precise likelihood of being a POC is determined according to a process such as the process shown in FIG. 4. FIG. 3 is an example of how accounts and potential POCs are identified based on the received transaction information. In some embodiments, the identified accounts and/or potential POCs are stored in storage 144 shown in FIG. 1. When updates are made to accounts and/or potential POCs, this information can be updated in storage. For example, when POCs are repaired/services or accounts replaced, the identification that they are compromised can be removed from storage.

At 306, an overall compromise blame score is calculated for each of the potential POCs. In some embodiments, the overall compromise blame score is calculated for a combination of account and potential POC (e.g., location). An overall compromise blame score is associated with a location and represents the measure of confidence (e.g., probability) that the location is a POC, e.g., how much the location is blamed for compromising accounts. Blame score calculation is further described herein with respect to FIG. 4. In some embodiments, the calculation is performed by a distributed computing system such as by one or more nodes of cluster 140 shown in FIG. 1. A distributed calculation is further described herein, e.g., with respect to FIGS. 4 and 5.

At 308, a likely POC is identified based on the overall compromise blame scores calculated at 306. The likely POC is selected from among the potential POCs identified at 304. An overall compromise blame score is calculated for each of the potential POCs. One or more potential POCs with overall compromise blame scores meeting one or more criteria are identified as likely POCs. For example, the criteria is a threshold score. In some embodiments, more than one likely POC is identified, for example a plurality of potential POCs meeting a threshold score are identified as likely POCs. Using the example of table 704.6 shown in FIG. 7E, locations L1-L3 are potential POCs with respective overall compromise blames scores of 0%, 0%, and 66%. Suppose the criterion for identification as a likely POC is 50%. Then, location L3 is identified as the likely POC because its score (66%) is higher than the threshold score while the other overall blame scores (0%) do not meet the threshold score.

A likely POC may be identified based on its geographical tags/properties. For example, the geographical tags of transaction locations are processed to determine patterns in the geographical locations of transactions. Patterns in geographical locations may allow grouping of similar transaction locations at various levels of specificity to identify that the grouping is a likely POC. For example, an individual location (e.g., each individual terminal within a store) does not meet a threshold for identifying a likely POC, but an aggregation of locations (e.g., a group of all terminals within a store) does meet the threshold. This may result in a group of transaction locations together as a single entity to be identified as a likely POC.

For example, suppose that an overall compromise blame score for each of twenty terminals is 1%. When viewed individually, the terminals do not meet a threshold score to qualify as a POC. However, when viewed together, the overall compromised blame score is the sum of the individual scores, i.e., 20%. This overall compromise blame score might meet a threshold (e.g., if the threshold is 15%), thus qualifying the group of terminals as a likely POC. Thus, it may be identified that the entire group of terminals is a likely POC. For example, where a source of a security breach is a store employee who occasionally steals credit card information from various different terminals in the store, the source can be identified in this manner.

In some embodiments, the grouping of transaction locations based on geographical co-location allows insights into an external source of compromise based on the grouping. For example, a grouping of co-located ATMs has been identified as a likely POC but the actual source of the compromise is not actually any of the ATMs because a card skimmer installed on a door to access the ATMs is the actual source of the compromise.

At 310, information about the likely POC is provided. This information allows action to be taken to repair/remove the likely POC such that the location is no longer a point of compromise, identify other accounts that have been compromised, and/or prevent other accounts from being compromised at the likely POC. The information about the likely POC may include an identifier of the likely POC, associated transaction/terminal location identifiers, geographical location identifiers, identifiers of accounts that may have been compromised at the like POC, and/or an identifier of a time period of when the likely POC may have been compromised (e.g., terminals one and three at Mom and Pop Shop in Mountain View, Calif. involving credit cards A-F between Jul. 1, 2015 and Jul. 4, 2015). The information about the likely POC (and accompanying information) may be provided to an issuer such as issuer 130 shown in FIG. 1, rendered on a GUI, or otherwise provided to a requester of the information.

The provided time/time period information associated with the likely POC includes time in terms of hours/minutes/seconds and/or date(s) of when it was likely compromised. For example, the time/time period provides an identification of the time window when a credit card skimmer is installed on a transaction device. The provided time period is identified by a start time and/or an end time.

In some embodiments, the start time is associated with a time of an earliest transaction/interaction at the likely POC (e.g., earliest within a time window of transactions to be analyzed) by an account that is known to have been compromised (e.g., an account identified as compromised in 302 and/or 304). For example, if the likely POC is assumed to have been the source where account information was misappropriated, accounts that interacted with the likely POC after the first account that is known to have been compromised are also likely compromised. Because an unknown actual first account compromised at the likely POC may exist, setting the start time as the time of the interaction/transaction at the likely POC by a known compromised account may be under-inclusive. However, in some cases, it may be desirable to be under-inclusive in an effort to minimize impacts to accounts that may not have been compromised. In some embodiments, the start time is set to be a set amount of time before the earliest transaction/interaction at the likely POC by the account that is known to be have been compromised. This set amount of time provides a buffer window in case the first known compromised account is not the first account that was compromised at the likely POC. The set amount of time may be adjustable to allow dynamic adjustment of the amount of over/under inclusivity of the compromised time window associated with the likely POC.

In some embodiments, the end time identifies a point in time when the likely POC has been verified as no longer a source of compromise. The end time is optional because the identified likely POC may be still a source of compromise at the time of detection. For example, a credit card skimmer remains operative on a transaction device identified as the likely POC.

The information provided at 310 can be used to repair transaction devices associated with the likely POC. For example, issuer 130 shown in FIG. 1 can inspect transaction devices associated with the likely POC to determine whether malicious devices have been installed on them.

The information provided at 310 may be used to identify additional accounts that were potentially compromised at the likely POC. For example, accounts that interacted with the likely POC during a time period when the likely POC was likely compromised likely had its account information misappropriated at the likely POC. These account holders are potentially unaware of the compromise and may not have yet reported the account to be compromised and the identification of these additional accounts allows proactive steps to be taken to prevent additional unauthorized use of these accounts (e.g., cancel these accounts and issue new credit cards).

FIG. 4 is a flow chart illustrating an embodiment of a process for calculating one or more blame scores. The process of FIG. 4 may be at least in part implemented on one or more components of nodes 142.1 and/or 142.2 shown in FIG. 1. In some embodiments, the process shown in FIG. 4 is performed by a processor, e.g., a processor implemented by a single-chip or by multiple processors such as processor 202 shown in FIG. 2. In some embodiments, at least a portion of the process of FIG. 4 is included in 306 of FIG. 3.

Figure 6:
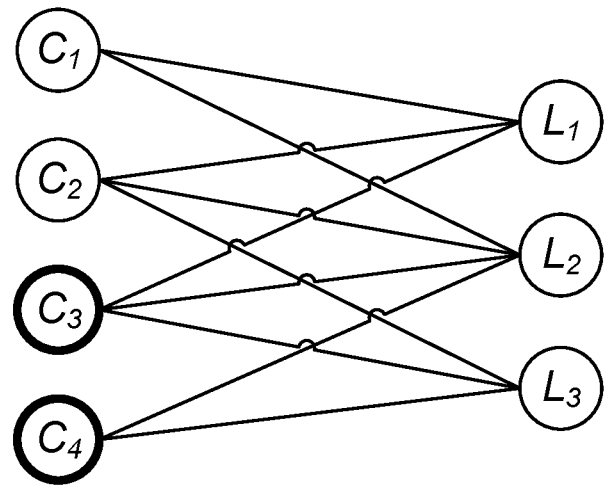
FIG. 6 is a conceptual diagram of transactions involving accounts and locations.

The process shown in FIG. 4 will be explained using the example of FIG. 6. FIG. 6 is a conceptual diagram of transactions involving accounts C1-C4 and locations L1-L3. Accounts C3, C4 are known to be compromised, but it is unknown which location(s) from among L1-L3 are a POC. Interaction between an account and a location is represented by a line between the account and the location. An interaction includes providing the account to the location such as swiping a credit card at a POS. In the example shown FIG. 6, account C1 has interacted with locations L1 and L2; account C2 has interacted with locations L1, L2, and L3; account C3 has interacted with locations L1, L2, and L3; and account C4 has interacted with locations L2 and L3. Given transactional information representing the scenario of FIG. 6, FIG. 4 identifies a likely POC from among locations L1, L2, and L3.

Returning to FIG. 4, at 402, a computer computational matrix representing blame score calculations is generated. For example, the computer computational matrix is to not only serve as a starting point of calculations to identify likely POCs but to store intermediate calculation values and to assist in distributing processing across nodes of a cluster. An example of this matrix includes a computer computational matrix with rows corresponding to accounts and columns corresponding to locations. Values in the example matrix include a measure of confidence based on whether the account has interacted with the location. Operations (e.g., 406/408) are performed using data of the example matrix to ultimately identify a pattern that suggests a location that is a source of compromise. Table 702.1 shown in FIG. 7A is an example of the computer computational matrix populated with initial values.

In some embodiments, the computer computational matrix is initialized with default element blame scores. An element blame score is the measure of confidence that a particular account assigns to a particular location, the score representing how much the particular account blames the particular location for being the source of the account's compromise. In some embodiments, the matrix includes overall compromise blame scores for respective locations. An overall compromise blame score for a particular location represents a measure of confidence that the particular location is a POC, e.g., likelihood the location is a source of account compromises.

The computer computational matrix is populated based on transaction data, e.g., transactional information received at 302. Accounts identified from the transactional information are represented by rows in table 702.1 and locations identified from the transactional information are represented by columns in table 702.1. If a transaction is performed by a particular account at a particular location, this information is tracked. For a given account, the locations are summed up and blame is equally apportioned to each location based on the total number of locations that have interacted with the account.

As described herein, processing the transactional information produces accounts and potential POCs. FIG. 7A is a conceptual diagram of an initial state of a computer computational matrix for identifying one or more likely POCs. FIG. 7A corresponds to the transaction scenario shown in FIG. 6 in which cards C3 and C4 are identified as compromised cards and cards C1-C4 have interacted with at least one of locations L1-L3 during a given time period. The transaction scenario shown in FIG. 6 is represented by transaction information including a list of accounts C1-C4, a list of locations L1-L3, times of transactions, and other information described with respect to 302.

In some embodiments, a computer computational matrix is constructed as shown in table 702.1 of FIG. 7A based on received transaction information. Table 1 shows an example of received transaction information in the form of a table.

TABLE 1

| Transaction ID | Time | Location | Account | Purchase | ... |
|---|---|---|---|---|---|
| 00001 | 13:05 | L2 | C1 | Item A × 1 | ... |
| 00002 | 13:06 | L1 | C2 | Item B × 5 | ... |

The transaction information is parsed to identify accounts and locations involved in the transactions. Using the scenario of FIG. 6 and the example of table 702.1, accounts are identified from the received transaction information as accounts C1-C4. Locations are identified from the received transaction information as locations L1-L3. For each combination of account and location (e.g., represented by a cell in table 702.1), it is determined whether the account and location have interacted with each other. For example, providing account details to the location is an interaction between the account and the location. Accounts and locations that have not interacted are marked accordingly. In the example shown in table 702.1, account C4 and location L1 have not interacted and account C1 and location L3 have not interacted. This is marked by a dash "- -" in table 702.1. If a location has not interacted with any cards, that location is removed from the table. That is, the column representing the location is removed from the table. In other words, in the example shown, locations that have interacted with at least one of the accounts C1-C4 are locations L1-L3.

In some embodiments, the computer computational matrix is uniformly initialized with blame equally apportioned among locations with which an account has interacted. In the example in which a compromised account has interacted with three locations, it is very likely that one of the three locations is a POC. In this example, the computer computational matrix representing element blame scores is initialized with 33% of the blame assigned to each of the three locations. Alternatively, the computer computational matrix representing element blame scores is initialized with measures of confidence that are weighted based on a number of transactions that have been processed at a given location. Suppose location L1 has processed two transactions from account C3, location L2 has processed one transaction from account C3, and location L3 has processed one transaction from account C3. The element blame scores may be weighted to assign, for account C3, more of the blame to location L1 because there have been more interactions with location L1. For example, the element blame score for C3/L1 is 50%, the element blame score for C3/L2 is 25%, and the element blame score for C3/L3 is 25%, which is proportional to the number of interactions between each location and each account.

Table 702.1 shown in FIG. 7A shows element blame scores at an initial state. Element blame scores represent, from the perspective of each account, how much each account C1-C4 blames a particular location (L1-L3). In this example, table 702.1 is uniformly initialized. For example, account C3, which is compromised, is very likely that one of locations L1-L3 is to blame for its compromise. Initially, account C3 apportions the blame equally between each of the locations L1-L3. This is shown in the table as 33% blame for each of locations L1-L3 for card C3. Similarly, account C4, which is compromised, is very likely that one of locations L2 and L3 is to blame for its compromise. Initially, account C4 apportions the blame equally between each of the locations L2 and L3. This is shown in the table as 50% blame for each of locations L2 and L3 for card C4. Cards C1 and C2 are not compromised. Thus, they do not blame any of the locations (0%).

Returning to FIG. 4, at 404, the computer computational matrix is pre-processed. Pre-processing simplifies subsequent calculations. For example, pre-processing removes calculations for non-compromised accounts. In other words, calculations are not made for cards that have not been compromised, which saves computational resources and yields a determination faster. Table 703.1 shown in FIG. 7A is an example of a pre-processed matrix. Rows for accounts C1 and C2 are removed from table 702.1 to generate pre-processed table 703.1 because accounts C1 and C2 are not compromised in this example (see discussion related to FIG. 6) and element blame scores need not be calculated for those accounts. The number of accounts with which a location interacts is recorded for calculations. For example, the number is useful for determining a compromise blame score as further described herein. The entry for C4/L1 is marked with a dash because account C4 and location L1 did not interact with each other and no calculation needs to be made for that combination.

At 406, an overall compromise blame score is calculated for each potential POC. The overall compromise blame score is the measure of confidence that a location is a POC. The overall compromise blame score is calculated based on element blame scores. The calculation of an overall compromise blame score includes determining a combined blame for each location. The combined blame is the sum of element blame scores (blames assigned by the accounts) for the given location. The overall compromise blame score for a given location ($p_j$) is obtained by dividing the combined blame ($\Sigma_i b_{ij}$) by the number ($n_j$) of accounts with which the location interacted, where p is a measure of confidence, b is an element blame score (further described herein), j is a location (column in table 702.1), and i is an account (row in table 702.1). The overall compromise blame score for a given location is given by:

$$p_j = \frac{\sum_i b_{ij}}{n_j} \qquad (1)$$

FIG. 7B is a conceptual diagram of a state of a computer computational matrix for identifying one or more likely POCs after a first iteration. Table 704.2 is an example of a computer computational matrix of overall compromise blame scores in which calculated blame scores are rounded to the nearest integer. Table 704.2 lists locations L1-L3 and corresponding overall compromise blame scores (probabilities). The overall compromise blame scores are generated from the initial element blame scores shown in table 703.1 as follows. Location L1 has a combined blame of 33%, location L2 has a combined blame of 83%, and location L3 has a combined blame of 83%. For location L1, the overall compromise blame score is 11% because location L1 has a combined blame of 33% and three accounts interacted with location L1. For location L2, the overall compromise blame score is 21% because location L2 has a combined blame of 83% and interacted with four cards. For location L3, the overall compromise blame score is 28% because location L3 has a combined blame of 83% and interacted with three cards.

Returning to FIG. 4, at 408, element blame scores are updated. The element blames scores are updated based on the overall compromise blame scores calculated in 406. Element blame scores are updated to proportionally reflect the overall compromise blame score. An element blame score for a given account and given location ($b_{ij}$) is obtained by the proportion of the overall compromise blame score for the given location ($p_j$) to the sum of overall compromise blame scores for locations with which the account has interacted ($\Sigma_{k \in B} p_k$) where b is a measure of confidence for an element, p is an overall compromise blame score (further described herein), k is an account, B is a set of potential POCs (e.g., $k \in B$ means an account has interacted with a potential POC), j is a location (column in table 702.1), and i is an account (row in table 702.1). The element score for a cell (i, j) in table 702.2 is given by:

$$b_{ij} = \frac{p_j}{\Sigma_{k \in B} p_k} \quad (2)$$

Turning to the example of FIG. 7B, following determination of the overall compromise blame scores shown in table 704.2 of FIG. 7B, element blame scores are updated to reflect that location L3 (28%) is blamed more than location L2 (21%) and location L1 (11%). The updated element blame scores are shown in table 702.2 and generated as follows. For account C3, the element blame score for location L1 is 18% because the overall compromise blame score for L1 is 11% and the sum of overall compromise blame scores for locations with which C3 has interacted is 60% (11%+21%+28%), the element blame score for location L2 is 35% because the overall compromise blame score for L2 is 21% and the sum of overall compromise blame scores for locations with which C3 has interacted is 60%, and the element blame score for location L3 is 47% because the overall compromise blame score for L3 is 28% and the sum of overall compromise blame scores for locations with which C3 has interacted is 60%. For account C4, the element blame score for location L2 is 43% because the overall compromise blame score for L2 is 21% and the sum of overall compromise blame scores for locations with which C4 has interacted is 49% (21%+28%), and the element blame score for location L3 is 57% because the overall compromise blame score for L3 is 28% and the sum of overall compromise blame scores for locations with which C4 has interacted is 49%.

In summary, 406 and 408 represent an alternating procedure in which element blames scores and overall compromised blame scores are updated in succession until convergence. In each iteration, element blame scores and overall compromise blame scores are updated in succession. That is, in a single iteration, 406 and 408 are performed. In the example in which element blame scores are initialized substantially uniformly, each iteration updates the element blame scores to differentiate between more probable potential POCs to be a likely POC and less probable potential POCs to be a likely POC. After a succession of iterations, the likely POC becomes more and more apparent as blame score value differences from each other amplify until convergence. At convergence, there is sufficient confidence (as defined by a threshold) that a potential POC is a likely POC, and the likely POC is returned.

At 410, it is determined whether overall compromise blame scores have converged. Repeating calculations (e.g., repeating 406 and 408) for each iteration minimizes the number of identified likely POCs and increases confidence that the identified likely POCs are correct. As iterations are repeated, trends become apparent. For instance, blame scores may trend lower for some potential POCs while blame scores may trend higher for other potential POC(s) after each iteration to amplify the blame score differences between the potential POCs. The calculations can be repeated until values stabilize. As more iterations are performed, typically the magnitude of changes between iterations decreases. Values stabilize when the magnitude of changes meets a threshold, indicating that the values change relatively minimally between iterations. Stable values indicate that the most probable POCs have been identified to a relatively high level of confidence. In other words, as iterations of calculations progress, the results of the calculations become more precise (e.g., the identified likely POCs are more likely to be correct). Convergence includes determining whether values have stabilized. In some embodiments, the determination is made by determining the difference between successive overall compromise blame scores. When the overall compromise blame scores are no longer changing too much (as measured by a convergence criteria), then the scores have converged.

Convergence is based on pre-defined criteria such as a threshold. For example, when the difference between a current overall compromise blame score and an overall compromise blame score for a previous iteration is below a convergence threshold, then the overall compromise blame scores are determined to have converged. In other words, if the difference between successive overall compromise blame scores meets a convergence threshold, the overall compromise blame scores are determined to have converged. As another example, the pre-defined criteria include a length of time and/or a number of iterations such that overall compromise blame scores are determined to have converged after a length of time has elapsed or a pre-defined number of iterations have been performed. Convergence indicates that a likely point of compromise has been identified.

If overall compromise blame scores have converged, control passes to 412 in which converged blame scores are provided. If overall compromise blame scores have not converged, control passes to 406 in which overall compromise blame scores are calculated. 406 and 408 can be performed until overall compromise blame scores are determined to have converged (410). In the example of FIG. 7B, the overall compromise blame scores have not converged. Thus, a second iteration is performed in which overall compromise blame scores are calculated/updated based on the updated element scores shown in table 704.3 and table 702.3 of FIG. 7C.

In some instances, values may never converge or may take too many iterations of calculations (e.g., iterations of 406 and 408 of FIG. 4) to reach convergence, and it may be inefficient to perform iterations until values stabilize. A time limit may be imposed such that convergence is determined to have occurred after a time threshold. The threshold can be defined by a number of iterations, a length of time since calculations began, etc. In some embodiments, the convergence criteria include a time threshold. For example, a potential POC with the highest score relative to other POCs after a threshold length of time after calculations begin satisfies the convergence criteria. As another example, after a length of time has elapsed since calculations began, a potential POC having a change in score (e.g., a score generated by a second iteration compared with a score generated by a first iteration) meeting a threshold score is determined to have converged. For example, the time threshold defines a length of time that has elapsed since a first overall compromise blame score was calculated. In some cases, the addition of the time threshold to the convergence criteria allows a result to be determined earlier than would be determined without the time threshold. For example, scores are determined to have converged if, 5 ms after calculations began, a convergence threshold is met. FIG. 7B shows scores after a first iteration. In this example, the scores have not yet converged because a convergence threshold is not met.

FIG. 7C is a conceptual diagram of a state of a computer computational matrix for identifying one or more likely POCs after a second iteration. Table 704.3 shows overall compromise blame scores for each of the locations L1-L3 in which calculated blame scores are rounded to the nearest integer. Location L1 has a combined blame of 18%, location L2 has a combined blame of 78%, and location L3 has a combined blame of 104%. For location L1, the overall compromise blame score is 6% because location L1 has a combined blame of 18% and three accounts interacted with location L1. For location L2, the overall compromise blame score is 20% because location L2 has a combined blame of 78% and interacted with four cards. For location L3, the overall compromise blame score is 35% because location L3 has a combined blame of 104% and interacted with three cards. The element scores are then updated based on the overall compromise blame scores as shown in table 702.3 and according to the procedures described herein.

FIG. 7D is a conceptual diagram of a state of a computer computational matrix for identifying one or more likely POCs after a third iteration. Table 704.4 shows overall compromise blame scores for each of the locations L1-L3 in which calculated blame scores are rounded to the nearest integer. The element scores are then updated based on the overall compromise blame scores as shown in table 702.4 and according to the procedures described herein. The calculation of overall compromise blame scores and element blame scores can be repeated until convergence.

FIG. 7E is a conceptual diagram of a computer computational matrix for identifying one or more likely POCs including converging overall compromise blame scores. Table 704.5 shows overall compromise blame scores (rounded to the nearest integer) that have not converged. The procedures described herein are repeated (represented by " . . . " in FIG. 7E) until convergence. Table 702.5 shows element blame scores in an iteration immediately before convergence. That is, overall compromise blame scores in table 704.6 are generated from element blame scores of table 702.5

The overall compromise blame scores in table 704.6 are determined to have converged because the difference between the current overall compromise blame score (66% for location L3) and an overall compromise blame score from a previous iteration (not shown) is less than a threshold. In this example, the differences between the overall compromise blame score for location L3 in previous iterations do not meet this threshold (7% between iteration 704.2 and 704.3, 5% between iteration 704.3 and 704.4, and 6% between iteration 704.4 and 704.5).

Returning to FIG. 4, at 412, converged overall compromise blame scores are provided. The converged overall compromise blame scores reflect the likely POC, where the likely POC has an overall compromised blame score that meets a threshold. The overall compromise blame scores may be provided as a list of scores. Using the example of FIG. 7E, the overall compromise blame scores corresponding to probabilities that a location is a likely POC (66% for location L3 and 0% for each of locations L1 and L2) are provided. In some embodiments, the converged overall blames scores are used at 308 of FIG. 3 to identify a likely POC. Using table 704.6 shown in FIG. 7E, locations L1-L3 are potential POCs with respective overall compromise blames scores of 0%, 0%, and 66%. Suppose the criterion for likely POC is exceeding a threshold of 50%. Then, location L3 is identified as the likely POC because its score (66%) exceeds the threshold, while the scores for the other locations (0%) do not exceed the threshold.

In some embodiments, more than one likely POC is identified. For example, multiple transactions/locations at the same merchant may be compromised. In this case, element blame scores are updated as follows. An element blame score for a given account and given location ($b_{ij}$) is obtained by the proportion of the overall compromise blame score for the given location ($p_j$) to the sum of overall compromise blame scores for locations with which the account has interacted and the locations do not correspond to the same merchant ($\Sigma_{k \in B \text{ and } merch(j) \neq merch(k)} p_k$), where b is a measure of confidence for an element, p is an overall compromise blame score (further described herein), k is an account, B is a set of potential POCs and merch( ) is a merchant (e.g., $k \in B$ and merch(j)·merch(k) means an account has interacted with a potential POC and the potential POC does not correspond to the same merchant), j is a location (column in table 702.1), and i is an account (row in table 702.1). The element score for a cell (i, j) in table 702.2 is given by:

$$b_{ij} = \frac{p_j}{p_j + \Sigma_{k \in B \text{ and } merch(j) \neq merch(k)} p_k} \quad (3)$$

In an alternative embodiment, an overall compromise blame score is based on previously calculated probabilities and relative confidence between a current overall compromise blame score and one or more previous calculated overall compromise blame scores. For example, the overall compromise blame score is calculated by weighting (by factors α and β) prior probabilities. The overall compromise blame score for a given location ($p_j$) is obtained by dividing (i) the sum of a combined blame ($\Sigma_i b_{ij}$) and a weighting factor (α) by (ii) the sum of a number ($n_j$) of accounts with which the location interacted, the weighting factor (α), and a second weighting factor (β), where p is a measure of confidence, b is an element blame score (further described herein), j is a location (column in table 702.1), and i is an account (row in table 702.1). The overall compromise blame score for a given location is given by:

$$p_j = \frac{\Sigma_i b_{ij} + \alpha}{n_j + \alpha + \beta} \quad (4)$$

In some embodiments, an overall compromise blame score is calculated according to equation (4) in place of equation (1). In some embodiments, α and β can be selected to alter the rate of convergence (e.g., make convergence occur sooner). α and β define the confidence in previous score calculations (e.g., from prior iterations) compared with a current iteration. This affects how many iterations are made to become confident that a location has been compromised, e.g., to reach convergence. α is functionally a "virtual" compromised account that interacted with a location (j) and β is functionally a "virtual" non-compromised account that interacted with a location (j). Thus, two locations with a same ratio of compromised to non-compromised cards will have their measures of confidence adjusted according to the weighting on how different they are from a prior distribution (prior iteration).

FIG. 5 is a flow chart illustrating an embodiment of a process for identifying one or more POCs including distributing calculation of one or more blame scores. The process of FIG. 5 may be at least in part implemented on one or more nodes of cluster 140 shown in FIG. 1. In some embodiments, the process shown in FIG. 5 is performed by a processor, e.g., a processor implemented by a single-chip or by multiple processors such as processor 202 shown in FIG. 2. In some embodiments, the computation can be performed using a GPU. In some embodiments, at least a portion of the process of FIG. 5 is before 406 of FIG. 4.

The identification of likely POCs is ideally to be performed efficiently, quickly, and accurately. The longer it takes to detect a point of compromise, the more likely stolen information will be used. Given the vast amount of transaction data required to be processed and calculations to be performed, improvements in data processing and the functioning of computer systems are required to achieve desired performance.

In some embodiments, calculation of one or more blames scores is distributed among a plurality of machines. That is, more than one machine is used to calculate the element blame scores and/or the overall compromise blame scores. Each machine updates a part of the computer computational matrix and the distributed calculations are synchronized as follows. Using a plurality of nodes to handle these calculations involves strategic division and distribution of calculations among the nodes.

According to the process of FIG. 5, calculations are handled in an efficient manner. The work of performing the calculations may be divided among multiple nodes of a cluster based on matrix elements rather than simply assigning a particular calculation to a particular node on an individual calculation by calculation basis. For example, a computer node of a cluster is assigned to handle all calculations required to populate one or more assigned elements of the matrix as further described herein.

At 502, a computer computational matrix is divided into computational blocks, where each block or group of blocks is assigned to a respective node for calculation. By way of non-limiting example, ways to divide the computer computational matrix include transaction-based and element-based. Each node performs a process such as the one shown in FIG. 4 for its portion of the computer computational matrix. In some embodiments, the division of the computer computational matrix is in accordance with a distribution algorithm such as MapReduce, Spark, etc.

One way to divide the computer computational matrix is to divide the computational matrix into computational blocks based on elements of the computational matrix. For example, cells/elements of the computational matrix are to be filled with calculated values and the cells/elements of the computational matrix are divided among the nodes such that the node assigned to a particular cell/element is to perform the calculations necessary to determine the calculated value to fill the particular cell/element. The grouping of one or more matrix cells/elements in a computational block may include adjacent elements of a particular row of the computational matrix, a particular column of the computational matrix, and/or a block of adjacent elements of a portion of a particular column and/or row.

In the example of the table shown in 702.1 in FIG. 7A, an example of element-based division assigns each of the locations L1-L3 to a respective node such that each node handles calculations for a particular location. That is, one node handles calculations for column L1, another node handles calculations for column L2, and another node handles calculations for column L3. Of course, calculations can be apportioned unevenly. For example, one node handles calculations for column L1 and another node handles calculations for columns L2 and L3. Another example of element-based division for the table of FIG. 7A assigns each of the accounts C1-C4 to a respective node such that each node handles calculations for a particular account. That is, a first node handles calculations for row C1, a second node handles calculations for row C2, a third node handles calculations for row C3, and a fourth node handles calculations for row C4. Of course, calculations can be apportioned unevenly. For example, one node handles calculations for accounts C1-C3 and another node handles calculations for account C4.

Another way to divide the computer computational matrix is based on division of input data (e.g., transaction data) required to calculate the elements of the computational matrix. Each computational block may include a subset of input data required to be processed for the computational matrix. For example, transaction data-based division assigns a sub-group of transactions from the list of received transactions (e.g., transactions received in 302 of FIG. 3) to a node for computation. In data-based division, each node makes individual calculations based on its assigned data portion and the results of the nodes are combined together to generate the resulting matrix. In contrast to the element-based division, data-based division may result in multiple nodes performing calculations to determine a computational matrix element/cell.

Suppose the received transaction information is represented by Table 1 (reproduced below):

TABLE 1

| Transaction ID | Time | Location | Account | Purchase | ... |
|---|---|---|---|---|---|
| 00001 | 13:05 | L2 | C1 | Item A × 1 | ... |
| 00002 | 13:06 | L1 | C2 | Item B × 5 | ... |

An example of transaction data-based division assigns Transaction 00001 to a first node and assigns Transaction 00002 to a second node. As another example, a node can handle several transactions (e.g., a first node handles Transaction 00001 and Transaction 00002). As another example, transaction data is divided based on location, account, etc. A first node handles all location L1 transactions. Each node performs the process shown in FIG. 4 for its respective transaction. Using the example of 702.1 shown in FIG. 7A, various nodes are responsible for each element and the element blame scores are obtained by combining the results determined by each node. For account C3 and location L1, the measure of confidence, 33%, is obtained by summing the measure of confidence determined by those nodes that are responsible for calculations for transactions involving account C3 and L1. Suppose two transactions involve account C3 and location L1. The first transaction is assigned to a first node and the second transaction is assigned to a second node. The measure of confidence based on the first transaction is combined with the measure of confidence based on the second transaction to obtain the overall measure of confidence. In some embodiments, each node generates its own resulting matrix. Multiple resulting matrices (generated by each node) are combined at the end of each step (e.g., 406/408) to produce a single result for each matrix calculation step.

At 504, the blocks are distributed among computational nodes for distributed computation. For example, nodes of cluster 140 shown in FIG. 1 collaborate to calculate values of a computer computational matrix. The blocks can be distributed among nodes according to the division determined in 502 in various fashions, e.g., round robin, based on a load of a node, based on data locality, and the like.

In a round robin distribution scheme, blocks are distributed to each node in a circular order. Using the example of a cluster of three nodes, a first block is distributed to a first node, a second block is distributed to a second node, and a third block is distributed to a third node. A fourth block is handled by returning to the first node, e.g., the fourth block is distributed to the first node, a fifth block is distributed to the second node, and a sixth block is distributed to the third node.

In load-based distribution, load balancing is used to distribute blocks to nodes based on the node's load. Using the example of a cluster of three nodes, to balance loads on three nodes of a cluster, a block is assigned to the node with the lightest load out of the three nodes.

In data locality distribution, blocks stored closer to a node are assigned to that node rather than a node farther away from the blocks. Using the example of a cluster of three nodes, a block is assigned to the closest node.

Division of a computer computational matrix into blocks and distribution of the blocks among nodes for calculation will now be explained with respect to FIGS. 7A-7E. Table 702.1 represents a list of received transaction information. In some embodiments, after assembly of the computer computational matrix represented by table 702.1, rows C1 and C2 are removed by pre-processing (as described herein).

In an example in which division is element-based by location, division and distribution is as follows. Calculations are divided by location such that each of the locations L1-L3 is assigned to a respective node. The computer computational matrix is divided among the three nodes such that each node handles calculations for one column of the table. In this example, a first node handles calculations for column L1, a second node handles calculations for column L2, and a third node handles calculations for column L3. Using the example of 703.1 in FIG. 7A, a first node handles calculations for location L1, a second node handles calculations for location L2, and a third node handles calculations for location L3. At the end of each iteration, results are synchronized to update the overall computer computational matrix. For example, an iteration yields a result generated by the first node for location L1, a result generated by the second node for location L2, and a result generated by the third node for location L3. These results are synchronized to update the table 703.1 before proceeding to a second iteration of calculations.

Turning to table 704.2, overall compromise blame scores are calculated as follows. The first node calculates overall compromise blame scores for location L1, the second node calculates overall compromise blame scores for location L2, and the third node calculates overall compromise blame scores for location L3. The first node determines that the overall blame score for location L1 is 11% by dividing the combined blame for L1 (33%) by the number of accounts with which location L1 interacted (3). The second node determines that the overall blame score for location L2 is 21% by dividing the combined blame for L2 (83%) by the number of accounts with which location L2 interacted (4). The third node determines that the overall blame score for location L3 is 28% by dividing the combined blame for L3 (83%) by the number of accounts with which location L1 interacted (3).

Turning now to table 702.2 in FIG. 7B, element blame scores are calculated as follows. The first node determines that the element blame score for location L1 is 18% because the overall compromise blame score for L1 is 11% and the sum of overall compromise blame scores for locations with which C3 has interacted is 60% (11%+21%+28%). The second node determines that the element blame score for account C3/location L2 is 35% because the overall compromise blame score for L2 is 21% and the sum of overall compromise blame scores for locations with which C3 has interacted is 60%. The second node determines that the element blame score for account C4/location L2 is 43% because the overall compromise blame score for L2 is 21% and the sum of overall compromise blame scores for locations with which C4 has interacted is 49% (21%+28%). The third node determines that the element blame score for account C3/location L3 is 47% because the overall compromise blame score for L3 is 28% and the sum of overall compromise blame scores for locations with which C3 has interacted is 60%. The third node determines that the element blame score for account C4/location L3 is 57% because the overall compromise blame score for L3 is 28% and the sum of overall compromise blame scores for locations with which C4 has interacted is 49%.

In an example in which division is transaction-based, division and distribution is as follows. Calculations are divided by transaction among two nodes for table 702.1 in FIG. 7A. In some embodiments, after assembly of the computer computational matrix represented by table 702.1, rows C1 and C2 are removed by pre-processing (as described herein) resulting in table 703.1 while retaining a count of the number of non-compromised accounts for calculations, as further described herein. Removing rows of the table reduces the number of calculations that are made because fewer table entries are populated compared with table 702.1. The computer computational matrix is divided among the two nodes such that each node handles calculations for one row of table 703.1. In this example, a first node handles calculations for row C3 and a second node handles calculations for row C4.

Turning to table 704.2, overall compromise blame scores are calculated based on element blame scores shown in table 703.1 as follows. The first node calculates overall compromise blame scores for account C3 and the second node calculates overall compromise blame scores for account C4. In some embodiments, the first node generates a first matrix and the second node generates a second matrix and the matrices are combined. In other words, the results of the respective calculations made by each node are combined to obtain overall compromise blame scores as follows.

For location L1, the first node determines that the overall blame score for this location is 11% by dividing the combined blame for L1 (33%) by the number of accounts with which location L1 interacted (3). For location L2, the first node determines that the overall compromise blame score for this location is 8.25% by dividing the combined blame (33%) by the number of accounts with which location L2 interacted (4). For location L3, the first node determines that the overall compromise blame score for this location is 11% by dividing the combined blame (33%) by the number of accounts with which location L3 interacted (3).

For location L1, the second node does not make a calculation because its transactions (account C4) do not involve interaction between location L1 and account C4. For location L2, the second node determines that the overall blame score for this location is 12.5% by dividing the combined blame (50%) by the number of accounts with which location L2 interacted (4). For location L3, the second node determines that the overall blame score for this location is 16.67% by dividing the combined blame (50%) by the number of accounts with which location L3 interacted (3).

After individual nodes complete calculations assigned to the node, the results are combined to generate a final table. The final table is a result for determining convergence or a starting point for subsequent calculations. In this example, the calculations of the first node and second node are combined by summing the generated results generated by the nodes. For location L1, the overall compromise blame score is 11% as shown in table 704.2 of FIG. 7B. For location L2, the overall compromise blame score is 21% (sum of 8.25% calculated by the first node and 12.5% calculated by the second node). For location L3, the overall compromise blame score is 28% (sum of 11% calculated by the first node and 16.67% calculated by the second node).

Turning now to table 702.2 in FIG. 7B, element blame scores are calculated as follows. The first node determines that the element blame score for account C3/location L1 is 18% because the overall compromise blame score for L1 is 11% and the sum of overall compromise blame scores for locations with which C3 has interacted is 60% (11%+21%+28%). The first node determines that the element blame score for account C3/location L2 is 35% because the overall compromise blame score for L2 is 21% and the sum of overall compromise blame scores for locations with which C3 has interacted is 60%. The first node determines that the element blame score for account C3/location L3 is 47% because the overall compromise blame score for L3 is 28% and the sum of overall compromise blame scores for locations with which C3 has interacted is 60%.

The second node determines that the element blame score for account C4/location L2 is 43% because the overall compromise blame score for L2 is 21% and the sum of overall compromise blame scores for locations with which C4 has interacted is 49% (21%+28%). The second node determines that the element blame score for account C4/location L3 is 57% because the overall compromise blame score for L3 is 28% and the sum of overall compromise blame scores for locations with which C4 has interacted is 49%.

The results of the first node and second node are combined (e.g., the first node contributes the third row and the second node contributes the fourth row) to obtain the element blame scores shown in table 702.2 of FIG. 7B.

Techniques of the present disclosure find application in preventing the use of misappropriated information, including fraud trips (using information), credit card account number theft, ATM spoofing, PIN capturing, etc. Fraudsters can steal and use information. For example, a fraudster illegally obtains an account such as a credit card and a debit card. Sometimes, the fraudster uses the credit card or debit card to purchase gift cards in an attempt to obscure the source of the credit/debit card. The fraudster then goes on a fraud trip to spend the illegally obtained money. For example, the fraudster uses the stolen credit card, debit card, or gift card at one or more stores to purchase goods. As another example, on a trip, the fraudster can visit one or more ATMs to withdraw money. Conventional computer systems are unable to efficiently detect this type of fraud. For simplicity, the example of FIG. 6 shows a situation with relatively few cards and buckets and assumes only two POCs: accounts C3 and C4. In many networks, there are millions of nodes, making it computationally expensive to calculate.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
receiving a pre-defined set of a plurality of potential points of compromise and a plurality of accounts;
initializing at least one element blame score for each potential point of compromise in the pre-defined set including by:
assigning, for each account that has interacted with a corresponding potential point of compromise, an element blame score to the corresponding potential point of compromise, the element blame score being proportional to a number of transactions made by a respective account at the corresponding potential point of compromise including by:
increasing the element blame score assigned to a corresponding potential point of compromise with which the respective account has interacted more frequently, and
decreasing the element blame score assigned to a corresponding potential point of compromise with which the respective account has interacted less frequently;
determining an overall compromise blame score for each potential point of compromise based on the at least one element blame score including by summing the element blame scores and dividing by a number of accounts with which the potential point of compromise interacted;
determining whether the determined overall compromise blame scores have converged;
in the event the determined overall compromise blame scores have converged, selecting at least one of the plurality of potential points of compromise as a likely point of compromise based at least on the corresponding overall compromise blame score of the selected likely point of compromise; and
in the event the determined overall compromise blame scores have not converged, updating the overall compromise blame score for each potential point of compromise and the element blame scores for each potential point of compromise.

2. The method of claim 1, wherein the determining an element blame score includes:
representing the determinations as at least a computer computational matrix operation, dividing a matrix of the computer computational matrix operation into computational blocks, and distributing the blocks among a plurality of computational computer nodes for distributed computer computation.

3. The method of claim 2, further comprising preprocessing the computer computational matrix operation to remove those accounts that are determined to not be compromised such that calculations are not made for the removed accounts.

4. The method of claim 2, wherein each of the computational blocks is at least one of: (i) associated with a different subset of input data to be utilized to fill the computer computational matrix operation, and (ii) includes a different subset of elements of the computer computational matrix operation.

5. The method of claim 1, further comprising determining the plurality of accounts based on received transaction data, the transaction data including transaction parameter values.

6. The method of claim 1, wherein the determining the element blame score includes comparing a convergence criteria with (i) a first element blame score generated by a first combination of identified transaction parameter values and (ii) a second element blame score generated by a second combination of identified transaction parameter values.

7. The method of claim 1, wherein the overall compromise blame score for a potential point of compromise includes a sum of the determined at least one element blame score divided by a number of accounts with which the potential point of compromise interacted weighted by at least one past calculation of the overall compromise blame score.

8. The method of claim 1, wherein the determining whether the determined overall compromise blame scores have converged includes determining that at least one of the overall compromise blame scores meets a convergence criteria.

9. The method of claim 8, wherein the determining that at least one of the overall compromise blame scores meets the convergence criteria includes determining whether a threshold amount of time has elapsed.

10. The method of claim 1, further comprising dynamically identifying the plurality of accounts and a points of compromise, wherein the identification of the plurality of accounts and the plurality of potential points of compromise is based on at least one interaction between at least one of the plurality of accounts and at least one of the plurality of potential points of compromise within a predefined time period.

11. The method of claim 1, further comprising receiving a list of accounts known to be compromised.

12. The method of claim 1, further comprising providing an identifier of the selected likely point of compromise.

13. The method of claim 12, wherein selecting the likely point of compromise includes determining a pattern in geographical locations of the plurality of potential points of compromise, and the identifier identifies a grouping of the plurality of the potential points of compromise selected based at least in part on the pattern.

14. The method of claim 1, further comprising determining the plurality of potential points of compromise based on each potential point of compromise having interacted at least once with a compromised account.

15. The method of claim 1, wherein the determining the element blame score includes using at least one previously-calculated probability and a relative confidence between a current overall compromise blame score and the at least one previously-calculated probability to determine the overall compromise blame score.

16. The method of claim 1, wherein the updating includes splitting a blame proportionally based on a measure of confidence.

17. The method of claim 1, wherein after the overall compromise blame score for each potential point of compromise and the at least one element blame score for each potential point of compromise of the plurality of potential points of compromise are updated in the event the determined overall compromise blame scores have not converged, a determination of whether the updated overall compromise blame scores have converged is performed.

18. The method of claim 1, wherein an element blame score associated with a compromised account is non-zero and an element blame scores associated with a non-compromised account is zero.

19. The method of claim 1, wherein each account in the plurality of accounts corresponds to a respective payment instrument.

20. A system for identifying a point of compromise, comprising:

a processor; and a memory coupled with the processor, wherein the memory is configured to provide the processor with instructions which when executed cause the processor to:

receive a pre-defined set of a plurality of potential points of compromise and a plurality of accounts;

initialize at least one element blame score for each potential point of compromise in the pre-defined set including by:

assigning, for each account that has interacted with a corresponding potential point of compromise, an element blame score to the corresponding potential point of compromise, the element blame score being proportional to a number of transactions made by a respective account at the corresponding potential point of compromise including by:

increasing the element blame score assigned to a corresponding potential point of compromise with which the respective account has interacted more frequently, and decreasing the element blame score assigned to a corresponding potential point of compromise with which the respective account has interacted less frequently;

determine an overall compromise blame score for each potential point of compromise based on the at least one element blame score including by summing the element blame scores and dividing by a number of accounts with which the potential point of compromise interacted;

determine whether the determined overall compromise blame scores have converged;

in the event the determined overall compromise blame scores have converged, select at least one of the plurality of potential points of compromise as a likely point of compromise based at least on the corresponding overall compromise blame score of the selected likely point of compromise; and in the event the determined overall compromise blame scores have not converged, update the overall compromise blame score for each potential point of compromise and the element blame scores for each potential point of compromise.

21. A computer program product for identifying a point of compromise, the computer program product being embodied in a non-transitory computer readable storage medium and comprising computer instructions for:
- receiving a pre-defined set of a plurality of potential points of compromise and a plurality of accounts;
- initializing at least one element blame score for each potential point of compromise in the pre-defined set including by:
  - assigning, for each account that has interacted with a corresponding potential point of compromise, an element blame score to the corresponding potential point of compromise, the element blame score being proportional to a number of transactions made by a respective account at transactions made by a respective account at the corresponding potential point of compromise including by:
    - increasing the element blame score assigned to a corresponding potential point of compromise with which the respective account has interacted more frequently, and
    - decreasing the element blame score assigned to a corresponding potential point of compromise with which the respective account has interacted less frequently;
- determining an overall compromise blame score for each potential point of compromise based on the at least one element blame score including by summing the element blame scores and dividing by a number of accounts with which the potential point of compromise interacted;
- determining whether the determined overall compromise blame scores have converged;
- in the event the determined overall compromise blame scores have converged, selecting at least one of the plurality of potential points of compromise as a likely point of compromise based at least on the corresponding overall compromise blame score of the selected likely point of compromise; and
- in the event the determined overall compromise blame scores have not converged, updating the overall compromise blame score for each potential point of compromise and the element blame scores for each potential point of compromise.

* * * * *

UNITED STATES PATENT AND TRADEMARK OFFICE
CERTIFICATE OF CORRECTION

PATENT NO. : 10,749,892 B2
APPLICATION NO. : 16/355562
DATED : August 18, 2020
INVENTOR(S) : Miguel Ramos de Araújo et al.

It is certified that error appears in the above-identified patent and that said Letters Patent is hereby corrected as shown below:

In the Specification

Column 17, Line 20, after "$(\Sigma_{k \in B} p_k)$", insert --,--.

Column 20, Line 34, delete "(e.g., k ∈ B and merch(j)·merch(k)" and insert --(e.g., $k \in B$ and $merch(j) \neq merch(k)$--, therefor.

Signed and Sealed this
Seventeenth Day of August, 2021

Drew Hirshfeld
*Performing the Functions and Duties of the*
*Under Secretary of Commerce for Intellectual Property and*
*Director of the United States Patent and Trademark Office*